(12) United States Patent
Snyder et al.

(10) Patent No.: US 8,725,390 B1
(45) Date of Patent: May 13, 2014

(54) SYSTEMS AND METHODS FOR OPTIMIZING FUEL INJECTION IN AN INTERNAL COMBUSTION ENGINE

(75) Inventors: Matthew W. Snyder, Fond du Lac, WI (US); Thomas S. Kirchhoff, Fond du Lac, WI (US); David G. Camp, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 365 days.

(21) Appl. No.: 13/344,414

(22) Filed: Jan. 5, 2012

(51) Int. Cl.
*F02D 41/26* (2006.01)
*F02D 41/40* (2006.01)

(52) U.S. Cl.
USPC ........... 701/105; 701/110; 123/435; 123/436; 123/480; 123/486

(58) Field of Classification Search
USPC .......... 123/435, 436, 480, 486, 490; 701/103, 701/104, 105, 110, 111
See application file for complete search history.

(56) References Cited

U.S. PATENT DOCUMENTS

| | | | |
|---|---|---|---|
| 5,680,842 A | 10/1997 | Schmid | |
| 6,092,510 A | 7/2000 | Przymusinski et al. | |
| 6,725,837 B2 * | 4/2004 | Hiraku et al. | 123/436 |
| 7,246,605 B2 | 7/2007 | Nazarov et al. | |
| 7,813,866 B2 * | 10/2010 | Demura | 701/103 |
| 2011/0132325 A1 | 6/2011 | Peters et al. | |

* cited by examiner

*Primary Examiner* — Hai Huynh
(74) *Attorney, Agent, or Firm* — Andrus Intellectual Property Law, LLP

(57) ABSTRACT

Systems and methods for optimizing fuel injection in an internal combustion engine adjust start of fuel injection by calculating whether one of advancing or retarding start of fuel injection will provide a shortest path from a source angle to a destination angle. Based on the source angle and a given injection pulse width and angle increment, it is determined whether fuel injection will overlap with a specified engine event if start of fuel injection is moved in a direction of the shortest path. A control circuit increments start fuel injection in the direction of the shortest path if it is determined that fuel injection will not overlap with the specified engine event, or increments start fuel injection in a direction opposite that of the shortest path if it is determined that fuel injection will overlap with the specified engine event.

20 Claims, 4 Drawing Sheets

SYSTEMS AND METHODS FOR OPTIMIZING FUEL INJECTION IN AN INTERNAL COMBUSTION ENGINE

FIELD AND BACKGROUND

The present disclosure relates to internal combustion engines and to systems and methods for optimizing fuel injection in internal combustion engines.

A non-direct injection, 4-stroke internal combustion engine typically comprises an intake valve for drawing an air/fuel mixture into a cylinder's combustion chamber and an exhaust valve for allowing combustion byproducts to escape from the chamber. A spark plug ignites the air/fuel mixture to move a piston, connecting rod, and crankshaft to provide power to the engine. These components are typically controlled by an engine control unit ("ECU"), which controls, among other things, the timing of fuel injection, the amount of fuel to be injected, and the timing of the spark. Control over the amount and timing of fuel injection can help minimize undesirable effects such as excessive exhaust emissions, horsepower loss, poor run quality due to misfire, or dilution of oil with fuel.

SUMMARY

This summary is provided to introduce a selection of concepts that are further described herein below in the detailed description. This summary is not intended to identify key or essential features of the claimed subject matter, nor is it intended to be used as an aid in limiting the scope of the claimed subject matter.

The present disclosure arose from research and development efforts to further optimize fuel injection while moving a start of fuel injection from a source angle to a destination angle. Specifically, the present systems and methods take into account when an air intake valve is closed with respect to the angle at which start of fuel injection occurs. The present inventors have realized that often when moving the start of fuel injection from a source angle to a destination angle, depending on the duration of fuel injection and the timing of the source and destination angles with respect to intake valve close, any fuel injection after intake valve close will not make it into an engine cylinder's combustion chamber to contribute to the given engine cycle. Fuel is not lost to the system, but the accounting of fuel may not total to what was anticipated unless intake valve close is taken into account. Overlapping intake valve close while moving the start of injection angle causes the engine to run either rich or lean depending on the direction intake valve close is approached, which is bad for emissions calibrations. Recognizing this, the present inventors have developed systems and methods for fully accounting for fuel when adjusting the start of injection angle.

In some examples, a system for optimizing fuel injection in an internal combustion engine is provided. The system can comprise a control circuit having a processor, a memory, and an input/output interface, wherein the control circuit adjusts start of fuel injection from a source angle to a destination angle. The control circuit can calculate whether one of advancing or retarding the start of injection will provide a shortest path from the source angle to the destination angle and can determine, based on the source angle and a given injection pulse width and angle increment, whether fuel injection will overlap with the specified engine event if start of fuel injection is moved in a direction of the shortest path. The control circuit can send a signal via the input/output interface to increment start of fuel injection in the direction of the shortest path if it is determined that fuel injection will not overlap with the specified engine event. The control circuit can send a signal via the input/output interface to increment start of fuel injection in a direction opposite that of the shortest path if it is determined that fuel injection will overlap with the specified engine event.

In other examples, a method of optimizing fuel injection in an internal combustion engine is provided. The method can comprise adjusting start of fuel injection from a source angle to a destination angle. The method can further comprise calculating whether one of advancing or retarding the start of injection will provide the shortest path from the source angle to the destination angle and determining, based on the source angle and a given injection pulse width and angle increment, whether fuel injection will overlap with a specified engine event if start of fuel injection is moved in a direction of the shortest path. The method can further comprise incrementing start of fuel injection in the direction of the shortest path if it is determined that fuel injection will not overlap with the specified engine event, or incrementing start of fuel injection in a direction opposite that of the shortest path if it is determined that fuel injection will overlap with the specified engine event. In other examples, a computer-readable medium having computer-executable instructions for performing the above method is provided.

BRIEF DESCRIPTION OF THE DRAWINGS

Embodiments of systems and methods for optimizing fuel injection in internal combustion engines are described with reference to the following figures. The same numbers are used throughout the figures to reference like features and components.

DETAILED DESCRIPTION OF THE DRAWINGS

In the present description, certain terms have been used for brevity, clearness, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims.

Figure 1:
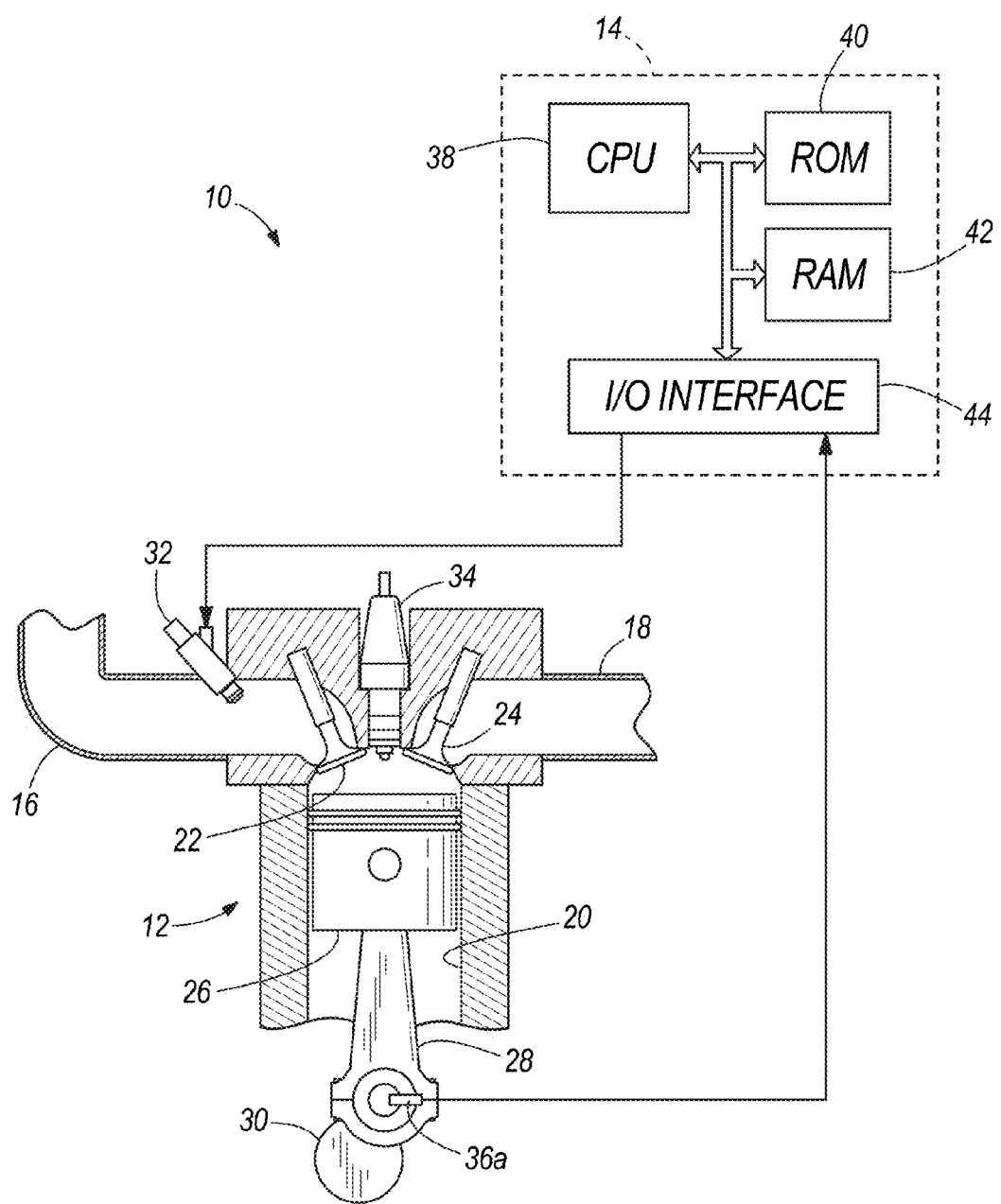
FIG. 1 is a schematic diagram of a system for optimizing fuel injection in an internal combustion engine.

FIG. 1 depicts one example of a fuel injection system 10. The fuel injection system 10 generally comprises an internal combustion engine 12 and an engine control unit ("ECU") 14. The engine 12 has an intake manifold 16 and an exhaust manifold 18, which are in communication with an engine cylinder 20 via an intake valve 22 and an exhaust valve 24. Within the cylinder 20 is a piston 26 connected via a connecting rod 28 to a crankshaft 30. The engine 12 also comprises a fuel injector 32 and a spark plug 34. In this example, the engine 12 is a non-direct injection engine and the fuel injector 32 injects fuel into the intake manifold 16. A sensor 36a is provided in this example for sensing engine running conditions. The sensor 36a is provided in the vicinity of the crankshaft 30 and connecting rod 28 and senses the speed of the engine 12. The sensor 36a need not be located where shown but could be located elsewhere. Further, although not shown in this example, other engine running condition sensors could be provided, such as for example manifold pressure sensors, temperature sensors, and throttle sensors.

Start of injection, the crank angle position at which the fuel injector 32 begins to spray fuel, is chosen such that exhaust emissions and oil dilution with fuel are minimized. The start of injection angle in the engine 12 may change depending on the engine running conditions. For example, the fuel injector 32 may inject on a closed or open air intake valve 22. The injector 32 may inject fuel on a closed intake valve 22 to facilitate fuel vaporization due to fuel contact with the hot intake valve 22. Injecting on a closed valve 22 may be chosen when the engine 12 is running at idle because the hot intake valve 22 allows for thorough vaporization of the relatively small amount of fuel used. The injector 32 may inject fuel on an open intake valve 22 in order to avoid wall wetting and fuel puddles in the intake manifold 16. Injecting on an open valve 22 may be chosen when the engine 12 is running at higher speeds so that all of the fuel goes straight into the cylinder 20. Thus, for example, the start of injection angle may change from a source angle chosen when the system 10 is in idle to a destination angle chosen according to higher engine 12 speeds, and vice versa.

In the example of FIG. 1, the engine 12 is a four-stroke internal combustion engine. The first stroke is the intake stroke, in which the intake valve 22 is opened and air flows through the intake manifold 16 towards the cylinder 20. As air flows through the intake manifold 16, fuel is injected into the flowing air via the fuel injector 32. The air/fuel mixture then flows through the intake valve 22 into the cylinder 20. During the intake stroke, the piston 26 moves in a downward direction within the cylinder 20. At the very end of the intake stroke, the piston 26 is in its lowermost position, known as "bottom dead center." As the piston 26 rises once again, the engine 12 begins the second stroke: the compression stroke.

During the compression stroke, both the intake valve 22 and the exhaust valve 24 are closed and the piston 26 compresses the air/fuel mixture within the cylinder 20. At the end of the compression stroke, the piston 26 is at its uppermost position, known as "top dead center." At the end of the compression stroke, when the piston 26 is at top dead center, the spark plug 34 ignites the air/fuel mixture. The air/fuel mixture combusts and the engine 12 begins the third stroke: the power stroke.

During the power stroke, the piston 26 is pushed downward by combustion of the air/fuel mixture. The piston 26 will once again reach bottom dead center at the end of the power stroke. After the power stroke is completed, the exhaust valve 24 is opened, and the engine 12 begins the fourth stroke: the exhaust stroke.

During the exhaust stroke, the piston 26 moves in an upward direction and pushes combustion byproducts out of the cylinder 20, past the open exhaust valve 24, and into the exhaust manifold 18. At the end of the exhaust stroke, the piston 26 is once again at top dead center. The engine 12 continues to perform these four cycles in succession.

The valves 22, 24 need not open at the precise times described above. Rather, there could be periods of valve overlap in which both the intake valve 22 and the exhaust valve 24 are open at the same time. For example, the intake valve 22 need not be closed during the exhaust stroke of the engine 12, but rather could be opened for certain high speed applications in which it is desirable to purge the cylinder 20 of combustion byproducts. Further, the valves 22, 24 could be controlled mechanically via cams on camshafts or could be controlled electronically. Further, the valves 22, 24 could be controlled via a process known as variable valve timing. According to variable valve timing, closing of the air intake valve 22 occurs at a different point in any given cycle of the internal combustion engine 12. There are various ways to achieve variable valve timing, including for example cam phasing, cam duration, and cam lift.

Moving on to control of the system 10, the ECU 14 comprises a control circuit having a processor containing programmable logic, for example a central processing unit ("CPU") 38; memory, for example ROM 40 and RAM 42; and an input/output interface 44. The fuel injector 32 and the sensors 36a communicate with the ECU 14 via the input/output interface 44, as will be described further herein below. It should be understood that the ECU 14 can comprise many different types and/or configurations of control circuits, and is not limited to that shown here. The ECU 14 can comprise one or more control sections and can be located proximate to or remotely from the engine 12. The ECU 14 is shown schematically as one box, but the system 10 can alternatively include several control circuits that are physically separated from one another and that communicate via a controller-area network. Further, the ECU 14 can comprise a user interface for programming or sending commands to the ECU 14.

The ECU 14 controls when fuel is injected into the system 10 based on the above-mentioned engine running conditions, such as whether the system 10 is in idle or running at higher speeds. The ECU 14 collects information on engine running conditions from various sensors, such as for example the sensors 36a. This information is relayed to the CPU 38 via the input/output interface 44. Thereafter, the CPU 38 uses the information on engine running conditions (which can be stored in the RAM 42) to access lookup tables stored in the ROM 40 to determine the start of fuel injection angle. Either the CPU 38 or the ROM 40 holds computer-executable instructions for performing a method for optimizing fuel injection, as described further herein below. After making such determinations, the CPU 38 relays commands through the input/output interface 44 to actuate numerous engine actuators, such as for example the fuel injector 32, a fuel pump, or the intake and exhaust valves 22, 24. In one example, the sensor 36a sends information on engine speed to the ECU 14 via the input/output interface 44, the CPU 38 processes this information and performs other calculations, and the ECU 14 sends a signal via the input/output interface 44 to actuate the fuel injector 32. In one example, the CPU 38 calculates indicated mean effective pressure, the average pressure in the cylinder 20 over an engine cycle.

Figure 2:
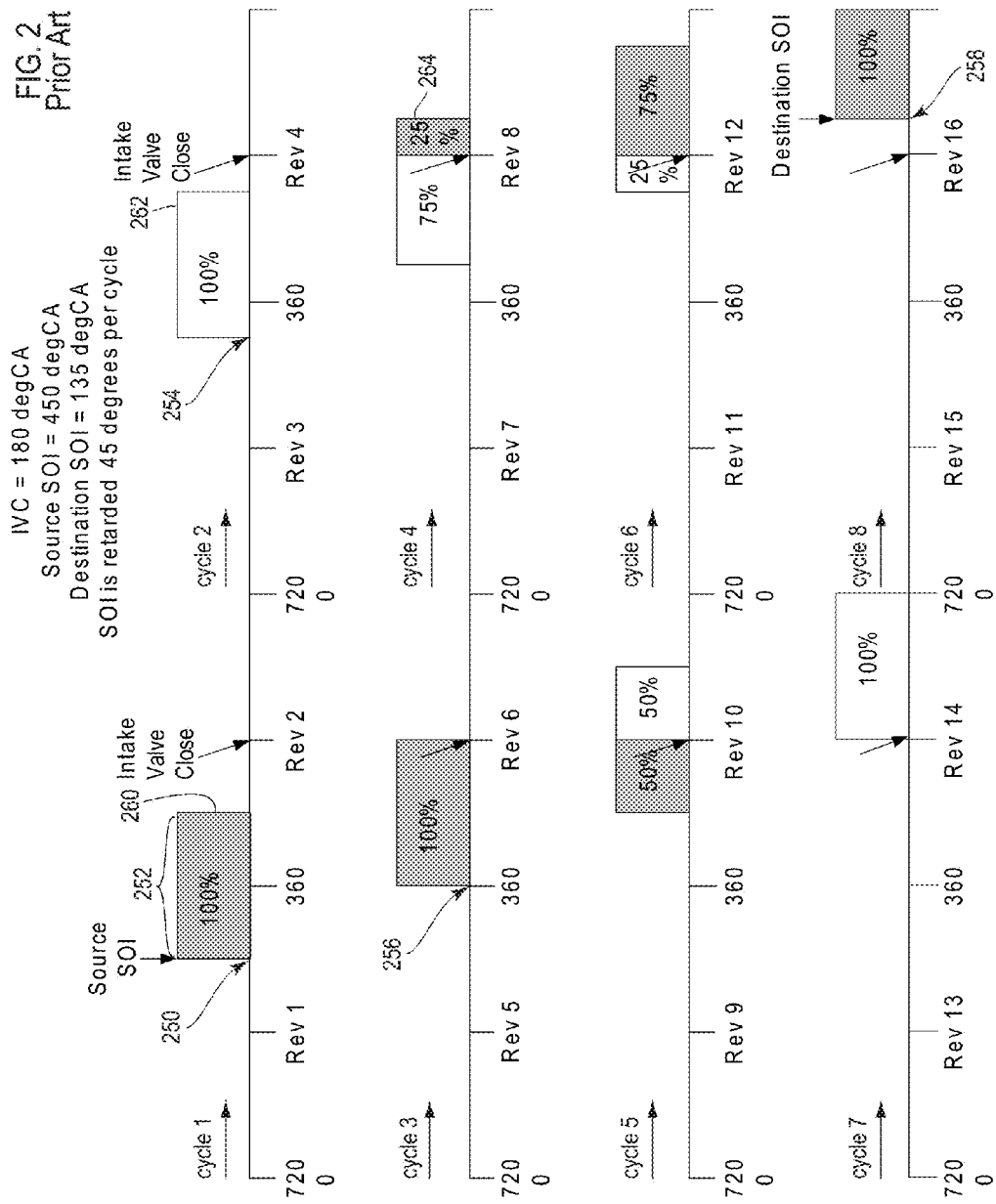
FIG. 2 is a timeline showing an example of movement of start of injection according to a known method.
Figure 3:
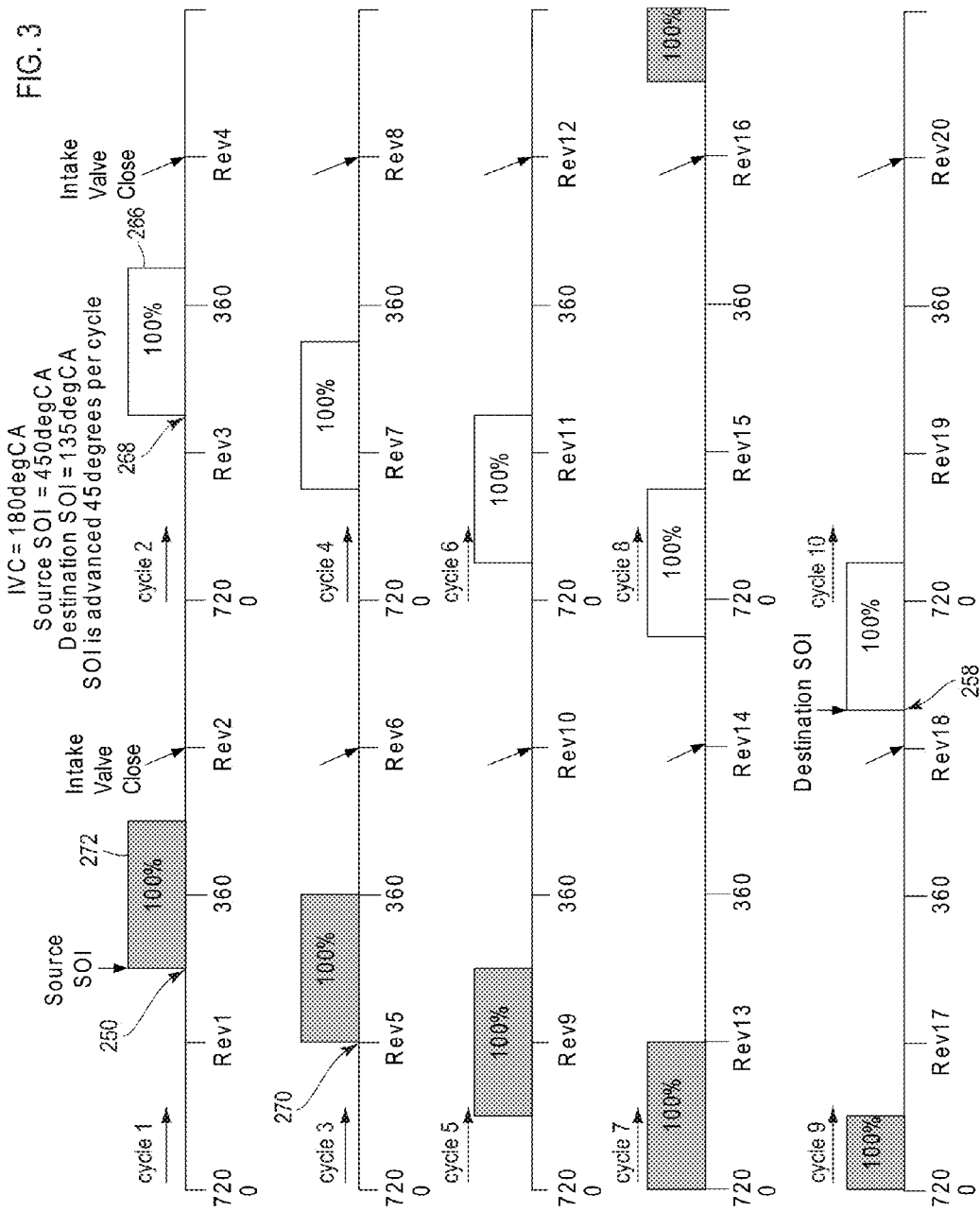
FIG. 3 is a timeline showing one example of movement of start of injection according to a method of the present disclosure.

Before describing the method shown in FIGS. 2 and 3, a few terms must be described. As mentioned above, "top dead center" is the angular position of the crankshaft 30 at which the piston 26 is at its uppermost position within the cylinder 20. The crank angle ("CA") is the angular position of an engine flywheel (connected to the crankshaft 30) relative to top dead center. One cycle of the engine 12 corresponds to two rotations of the crankshaft 30, or to four strokes of the piston 26. Thus, one cycle of the engine 12 counts down from 720° to 0°, with 720° corresponding to top dead center at the end of a compression stroke. At each 720° marker, the spark plug 34 fires.

Start of injection ("SOI") is the crank angle at which fuel injection begins. A source SOI is the crank angle from which the start of injection is changing. A destination 501 is the crank angle to which the start of injection is moving. Intake valve close ("IVC") is the crank angle at which the intake valve 22 closes. Any of the air/fuel mixture not in the cylinder 20 at the point of IVC will not combust during that cycle of the engine 12, but will remain in the intake manifold 16 until the next engine cycle.

The amount that the SOI angle is moved during any given engine cycle is "rate-limited" (moved at a fixed number of crank angle degrees per cycle) to avoid missing a fuel pulse completely. If the fuel pulse is moved by too many degrees in too short of a time, there is a possibility that the pulse will be scheduled to occur at an angle that has already passed for a given engine cycle, making it impossible to execute the pulse and resulting in missing the pulse entirely. The SOI angle is moved once per any given engine cycle.

Now with reference to FIG. 2, a timeline showing an example of movement of SOI according to a known method will be described. The timeline begins at 720 crank angle degrees ("degCA"), meaning the spark plug 34 has just fired and the piston 26 is on its downward power stroke. "Rev 1" on the timeline indicates that the crankshaft 30 has completed one revolution, i.e., the piston 26 has completed a power stroke at 540 degCA, and is now entering an exhaust stroke, where the piston 26 will once again reach top dead center at 360 degCA. The piston 26 will then continue downward for an intake stroke to complete Rev 2 of the crankshaft 30. At Rev 2 (180 degCA) the piston 26 is at bottom dead center and will thereafter continue upward for a compression stroke. Then, the piston 26 once again reaches top dead center at 0° to begin a new 720° cycle of the engine. Thus, the crankshaft 30 will go through two 360° revolutions per every one 720° cycle of the engine.

For purposes of example only, the source SOI shown at arrow 250 is at 450 degCA. The duration of fuel injection (mechanical pulse width) 252 is 180°. Accordingly, the end of injection is at 270 degCA. IVC occurs at 180 degCA for every 720° engine cycle. However, as mentioned above, the engine could also use variable valve timing. This would mean that IVC would occur at different angles during any given 720° engine cycle. In the example, SOI is retarded by an angle increment of 45° per each 720° cycle. Thus, it can be seen that during the second engine cycle the source SOI has been retarded from 450 degCA to 405 degCA as shown at arrow 254. This is known as "retarding" because the SOI occurs increasingly later in the engine cycle relative to the 720 degCA top dead center ignition moment. During the third cycle of the engine, the SOI is now at 360 degCA as shown at arrow 256. Again, this is achieved by retarding the SOI 45° from its angle during the second cycle of the engine, which was 405 degCA. The SOI is continually retarded 45° per engine cycle until it reaches a destination SOI, in this example 135 degCA, shown at arrow 258. In this example, it took seven engine cycles to move the SOI in 45° increments from the source SOI of 450 degCA to the destination SOI of 135 degCA. Retarding the SOI moves the SOI in the direction of the shortest path from the source SOI to the destination SOI because the destination SOI 258 occurs later in the engine cycle than the source SOI 250.

In FIG. 2, the amount of fuel that is allocated to a given engine cycle is shown in percentages illustrated by the gray and white boxes. For example, during the first cycle of the engine, 100% of the fuel injected is used during the first cycle as shown by the box 260. Similarly, 100% of the fuel injected during the second cycle of the engine is used during the second cycle as shown by the box 262. In contrast, as shown by the box 264, only 75% of the fuel injected during the fourth cycle of the engine is allocated to that cycle. This is because fuel injection overlaps with IVC at 180 degCA. As shown by box 264, 25% of the fuel injected is injected on a closed intake valve 22 and will remain in the intake manifold 16 until the next (the fifth) cycle of the engine 12. Fuel injection overlapping with IVC causes the accounting of fuel not to total to what was anticipated for the fourth engine cycle. For example, as shown by box 264, only 75% of fuel that was anticipated to enter the cylinder 20 will be combusted during the fourth cycle of the engine. Under-fueling by 25% may lead to undesirable effects as described above. 25% of the fuel injected during, the fourth cycle will be combusted during fifth cycle instead.

Recognizing that the shortest path as shown in FIG. 2 from the source SOI 250 to the destination SOI 258 may result in fuel injection crossing IVC, the present inventors have developed systems and methods for ensuring that all of the fuel injected during a given engine cycle is allocated to that cycle. FIG. 3 is similar to FIG. 2 in that the source SOI remains the same at 450 degCA, as shown at arrow 250. The destination SOI remains the same at 135 degCA as shown at arrow 258. Similarly, IVC occurs at 180 degCA. The difference between the timelines of FIGS. 2 and 3 is that in FIG. 3 the SOI is advanced by an angle increment of 45° per engine cycle. "Advancing" means that SOI occurs increasingly earlier in the engine cycle relative to the 720 degCA top dead center ignition moment. For example, as shown at arrow 268, the SOI has been advanced by 45° from the source SOI of 450 degCA such that the SOI occurs at 495 degCA during the second cycle of the engine. During the third cycle of the engine, the SOI has once again been advanced by 45° from 495 degCA to 540 degCA as shown at arrow 270. In this example, it takes nine cycles of the engine for the SOI to advance from the source SOI at 250 to the destination SOI at 258. Therefore, FIG. 3 shows the SOI moving in a direction opposite that of the shortest path, because it took nine engine cycles rather than seven to move from the same source SOI to the same destination Sat by the same angle increment. The shortest path from the source SOI 250 to the destination SOI 258 is accomplished by retarding the SOI 45° per each engine cycle as shown in FIG. 2. In contrast, in FIG. 3, the SOI is advanced 45° per cycle and is thus moved in a direction opposite that of the shortest path.

However, the gray and white boxes in FIG. 3 show that all of the fuel injected during any given engine cycle is accounted for during that cycle. During the first cycle of the engine, 100% of the fuel injected is allocated to that cycle as shown at box 272. Similarly, during the second cycle of the engine, 100% of the fuel is allocated to that cycle as shown at box 266. In fact, moving through each cycle of the engine, it can be seen that 100% of the fuel injected during each cycle of the engine is allocated to that respective engine cycle. In other words, fuel injection never overlaps with IVC as it did in the example of FIG. 2. In FIG. 3, although SOI is moved in the direction opposite that of the shortest path, the result is that no fuel is lost to any given cycle or remains in the intake manifold 16 to be used during a subsequent cycle. Rather, all of the fuel injected during a given cycle is accounted for during that given cycle. Accurately accounting for the fuel injected during a given cycle according to the example of FIG. 3 minimizes exhaust emissions and oil dilution with fuel when compared to the example of FIG. 2.

Figure 4:
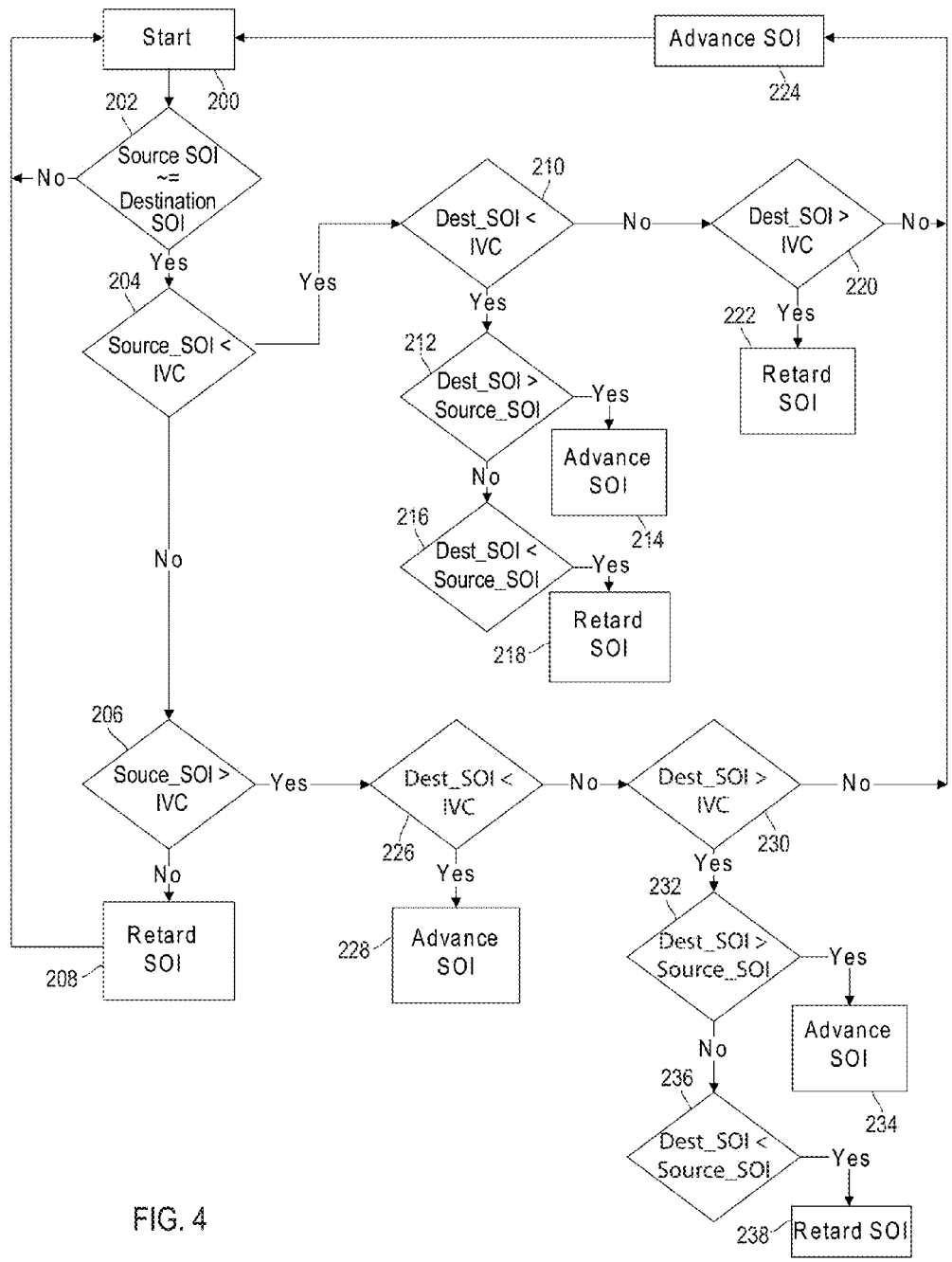
FIG. 4 is a block diagram outlining a method for optimizing fuel injection in an internal combustion engine.

One example of a method for determining whether SOI is to be advanced or retarded from the source SOI 250 to the destination SOI 258 is depicted in FIG. 4. The method may be carried out by the CPU 38. A source SOI is determined according to a lookup table (which can be stored in the ROM 40) and is subsequently stored in the RAM 42. For example, the lookup table can receive engine speed and calculated indicated mean effective pressure as inputs, and then output a source SOI. The destination SOI can be determined using the same lookup table. The source and destination SOI are input into the processor 38. A given angle increment (stored in the RAM 42 or the ROM 40) is also input into the processor 38. As mentioned above, the given angle increment is chosen to avoid missing a fuel pulse completely. An injection pulse width is also input into the processor 38.

The method begins at box 200. In the example shown, the method runs once per engine cycle, but in other examples the method could be run more or less often than once per engine cycle. In general, the method chooses to advance or retard SOI from the source SOI to the destination SOI in the direction of the shortest path, unless it is determined that doing so will result in fuel injection overlapping with IVC. In that case, SOI is moved in the direction opposite that of the shortest path to avoid fuel injection overlap with IVC.

Because one cycle of the engine 12 counts down from 720° to 0°, when referring to a given angle being less than or greater than another angle, this 720° cycle will be used for exemplary purposes to describe the following method. For example, in FIGS. 2 and 3, the source SOI at 450 degCA (arrow 250) is greater than the destination SOI at 135 degCA (arrow 258). However, other counting methods for keeping track of the relationship between source SOI, destination SOI, and IVC within an engine cycle are contemplated.

At box 202, it is determined whether the source SOI differs from the destination SOI. If the source SOI does not differ from the destination SOI, the method returns to box 200 to begin again during the next engine cycle. If the determination at box 202 is that the source SOI is not equal to the destination SOI, the method continues to box 204 where it is determined whether the source SOI is less than the angle at which IVC occurs. If the source SOI is not less than IVC, the method continues to box 206 where it is determined whether the source SOI is greater than IVC. If the source SOI is not greater than IVC, the method continues to box 208 and SOI is retarded once per engine cycle by a given angle increment until the source SOI reaches the destination SOI. The method then returns to box 200 where it begins again for another engine cycle. So long as it is determined that the destination SOI has not yet been reached, the method will continue to cycle through boxes 204, 206 and 208 until SOI is retarded to the destination SOI. If the destination SOI is greater than the source SOI, retarding the SOI will not be the shortest path; however, it is the path that ensures that fuel injection will not overlap with IVC.

If at box 204 it is determined that the source SOI is less than the angle at which IVC occurs, the method continues to box 210. At box 210, if it is determined that the destination SOI is less than IVC, the method continues to box 212. If it is determined that the destination SOI is not less than IVC, the method continues to box 220. At box 212, it is determined whether the destination SOI is greater than the source SOI. If so, then the SOI is advanced by a given angle increment per engine cycle as shown at box 214. This is the shortest path from the source SOI to the destination SOI and does not overlap with IVC because both the destination SOI and the source SOI occur after IVC. Alternatively, if it is determined at box 212 that the destination SOI is not greater than the source 501, it is determined at box 216 whether the destination SOI is less than the source SOI. If so, then the SOI is retarded by a given angle increment per engine cycle as shown at box 218. This is the shortest path from the source SOI to the destination SOI and does not overlap with IVC because both the source SOI and the destination SOI occur after IVC.

If the determination at box 210 is that the destination SOI is not less than IVC, it is determined at box 220 whether the destination SOI is greater than IVC. If yes, the method continues to box 222 and SOI is retarded by a given angle increment per engine cycle. This is not the shortest path between the source SOI and the destination SOI, but it ensures that fuel injection does not overlap with IVC. If it is determined that the destination SOI is not greater than IVC at box 220, the method continues to box 224 and SOI is advanced by a given angle increment per engine cycle. This is the shortest path between the source SOI and the destination SOI and does not result in fuel injection overlapping with IVC.

Returning to box 206, if it is determined that the source SOI is greater than IVC, it is determined at box 226 whether the destination SOI is less than IVC. If the destination SOI is less than IVC, the SOI is advanced by a given angle increment per engine cycle as shown at box 228. Advancing the SOI moves the SOI in the direction opposite that of the shortest path, but ensures that fuel injection does not overlap with IVC.

If it is determined at box 226 that the destination SOI is not less than IVC, the method continues to box 230 where it is determined whether the destination SOI is greater than IVC. If the destination SOI is not greater than IVC, then the method continues to box 224 where SOI is advanced by a given angle increment per engine cycle. This is not the shortest path, but it ensures that fuel injection does not overlap with IVC. If it is determined at box 230 that the destination SOI is greater than IVC, the method continues to box 232 and it is determined whether the destination SOI is greater than the source SOI. If yes, the method continues to box 234 and SOI is advanced by a given angle increment per engine cycle. This is the shortest path from the source SOI to the destination SOI and will not result in fuel injection overlapping with IVC because both the source and destination SOI occur before IVC. Alternatively, if it is determined at box 232 that the destination SOI is not greater than the source SOI, the method continues to box 236 and it is determined whether the destination SOI is less than the source SOI. If yes, the method continues to box 238 and SOI is retarded by a given angle increment per engine cycle. This is the shortest path from the source 501 to the destination SOI and will not result in fuel injection overlapping with IVC because both the source and destination SOI occur before IVC.

It should be understood that each of the boxes 214, 218, 222, 228, 234, and 238 return to box 200.

Therefore, with reference to FIGS. 1-4, a system 10 for optimizing fuel injection in an internal combustion engine 12 is shown. The system 10 comprises a control circuit 14 having a processor 38, a memory 40, 42, and an input/output interface 44. The control circuit 14 adjusts start of fuel injection from a source angle to a destination angle, calculates whether one is advancing or retarding at the start of injection will provide the shortest path from the source angle to the destination angle, and determines whether fuel injection will overlap with a specified engine event if start of fuel injection is moved in a direction of the shortest path. The control circuit 14 makes this determination based on the source angle and a given injection pulse width and angle increment. The control circuit 14 then sends a signal via the input/output interface 44 to increment start of fuel injection in the direction of the shortest path if it is determined that fuel injection will not overlap with the specified engine event. The control circuit 14 sends a signal via the input/output interface 44 to increment start of fuel injection in the direction opposite that of the shortest path if it is determined that fuel injection will overlap with the specified engine event.

In one example, the specified engine event may be closing of an air intake valve 22 of the internal combustion engine 12. Closing of the air intake valve 22 may occur at the same angle of any given engine cycle. Closing of the intake valve 22 may alternatively occur at a different angle of any given cycle of the internal combustion engine 12 according to variable valve timing, as described above. In other examples, the specified engine event may be intake valve open.

The system 10 may further comprise a fuel injector 32 for receiving a signal from the input/output interface 44 and for injecting fuel into the internal combustion engine 12. The fuel injector 32 may be positioned within the system 10 such that a resulting air/fuel mixture enters the internal combustion engine 12 through the air intake valve 22. For example, the fuel injector 32 could inject fuel into an intake manifold 16 of the internal combustion engine 12.

The system 10 may further comprise input sensors, for example 36a, for collecting information on engine 12 running conditions. This information can be relayed to the processor 38 via the input/output interface 44 of the control circuit 14. The memory, more specifically the ROM 40 or the RAM 42, can store a lookup table for determining start of fuel injection. The control circuit 14 can input the information on engine 12 running conditions into the lookup table to determine the source angle and the destination angle. The information on engine running conditions input into the lookup table can be engine speed according to sensor 36a and calculated indicated mean effective pressure. The control circuit 14 may retrieve the source angle from the memory (for example the RAM 42), compare the source angle to the destination angle to determine if the destination angle differs from the source angle, increment start of fuel injection if the destination angle differs from the source angle, and thereafter store the destination angle in the memory (for example the RAM 42) as the source angle. Alternatively, the control circuit 14 may not increment the start of fuel injection if the destination angle does not differ from the source angle. The control circuit 14 compares the source angle to the destination angle, for example once per cycle of the internal combustion engine 12.

Thus, the control circuit 14 sends a signal to advance the start of fuel injection if the source angle and the destination angle are less than an angle at which the engine event occurs and if the destination angle is greater than the source angle. The control circuit 14 sends a signal to retard start of fuel injection if the source angle and the destination angle are less than the angle at which the engine event occurs and if the destination angle is less than the source angle. The control circuit 14 sends a signal to retard start of fuel injection if the source angle is less than the angle at which the engine event occurs and if the destination angle is greater than the angle at which the engine event occurs. The control circuit 14 sends a signal to retard start of fuel injection if the source angle and the destination angle are greater than the angle at which the engine event occurs and if the destination angle is less than the source angle. The control circuit 14 sends a signal to advance start of fuel injection if the source angle and the destination angle are greater than the angle at which the engine event occurs and if the destination angle is greater than the source angle. The control circuit 14 send a signal to advance start of fuel injection if the source angle is greater than the angle at which the engine event occurs and if the destination angle is less than the angle at which the engine event occurs. The control circuit 14 sends a signal to retard start of fuel injection if the source angle is equal to the angle at which the engine event occurs. The control circuit 14 sends a signal to advance start of fuel injection if the destination angle is equal to the angle at which the engine event occurs.

A method of optimizing fuel injection in an internal combustion engine 12 is also provided. The method comprises adjusting start of fuel injection from a source angle to a destination angle. The method includes calculating whether one of advancing or retarding the start of injection will provide the shortest path from the source angle to the destination angle. The method further includes determining, based on the source angle and a given injection pulse width and angle increment, whether fuel injection will overlap with a specified engine event if start of fuel injection is moved in the direction of the shortest path. The method further includes incrementing start of fuel injection in the direction of the shortest path if it is determined that fuel injection will not overlap with the specified engine event, or incrementing start of fuel injection in the direction opposite that of the shortest path if it is determined that fuel injection will overlap the specified engine event.

Finally, a computer-readable medium having computer-executable instructions for performing a method of optimizing fuel injection in an internal combustion engine 12 is provided. The method may comprise the steps outlined above.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means plus function clauses are intended to cover the structures described herein as performing, the recited function and not only structural equivalents, but also equivalent structures. Thus, although a nail and a screw may not be structural equivalents in that a nail employs a cylindrical surface to secure wooden parts together, and whereas a screw employs a helical surface, in the environment of fastening wooden parts, a nail and a screw may be equivalent structures. It is the express intention of the applicant not to invoke 35 U.S.C. §112, paragraph six, for any limitations of any of the claims herein, except for those in which the claim expressly uses the words "means for" together with an associated function.

What is claimed is:

1. A system for optimizing fuel injection in an internal combustion engine, the system comprising:
   a control circuit having a processor, a memory, and an input/output interface, wherein the control circuit:
   adjusts start of fuel injection from a source angle to a destination angle;
   calculates whether one of advancing or retarding the start of injection will provide a shortest path from the source angle to the destination angle;
   determines, based on the source angle and a given injection pulse width and angle increment, whether fuel injection will overlap with a specified engine event if start of fuel injection is moved in a direction of the shortest path;
   sends a signal via the input/output interface to increment start of fuel injection in the direction of the shortest path if it is determined that fuel injection will not overlap with the specified engine event; and
   sends a signal via the input/output interface to increment start of fuel injection in a direction opposite that of the shortest path if it is determined that fuel injection will overlap with the specified engine event.

2. The system of claim 1, wherein the specified engine event is closing of an air intake valve of the internal combustion engine.

3. The system of claim 2, wherein closing of the air intake valve occurs at a different angle in any given cycle of the internal combustion engine.

4. The system of claim 2, further comprising a fuel injector for receiving the signal from the input/output interface and for injecting fuel into the internal combustion engine.

5. The system of claim 4, wherein the fuel injector is positioned within the system such that a resulting air/fuel mixture enters the internal combustion engine through the air intake valve.

6. The system of claim 1, further comprising input sensors for collecting information on engine running conditions, the information being relayed to the processor via the input/output interface.

7. The system of claim 6, wherein the memory stores a look-up table for determining start of fuel injection.

8. The system of claim 7, wherein the control circuit inputs the information on engine running conditions into the look-up table in order to determine the destination angle.

9. The system of claim 8, wherein the engine running conditions arc engine speed and indicated mean effective pressure.

10. The system of claim 9, wherein the control circuit further:
retrieves the source angle from the memory;
compares the source angle to the destination angle to determine if the destination angle differs from the source angle;
increments start of fuel injection if the destination angle differs from the source angle, and thereafter stores the destination angle in the memory as the source angle; and
does not increment start of fuel injection if the destination angle does not differ from the source angle.

11. The system of claim 10, wherein the control circuit compares the source angle to the destination angle once per a cycle of the internal combustion engine.

12. The system of claim 10, wherein the control circuit further:
sends a signal to advance start of fuel injection if the source angle and the destination angle are less than an angle at which the engine event occurs and if the destination angle is greater than the source angle;
sends a signal to retard start of fuel injection if the source angle and the destination angle are less than the angle at which the engine event occurs and if the destination angle is less than the source angle;
sends a signal to retard start of fuel injection if the source angle is less than the angle at which the engine event occurs and if the destination angle is greater than the angle at which the engine event occurs;
sends a signal to retard start of fuel injection if the source angle and the destination angle are greater than the angle at which the engine event occurs and if the destination angle is less than the source angle;
sends a signal to advance start of fuel injection if the source angle and the destination angle are greater than the angle at which the engine event occurs and if the destination angle is greater than the source angle;
sends a signal to advance start of fuel injection if the source angle is greater than the angle at which the engine event occurs and if the destination angle is less than the angle at which the engine event occurs;
sends a signal to retard start of fuel injection if the source angle is equal to the angle at which the engine event occurs; and
sends a signal to advance start of fuel injection if the destination angle is equal to the angle at which the engine event occurs.

13. A method of optimizing fuel injection in an internal combustion engine, the method comprising:
adjusting start of fuel injection from a source angle to a destination angle;
calculating whether one of advancing or retarding the start of injection will provide a shortest path from the source angle to the destination angle;
determining, based on the source angle and a given injection pulse width and angle increment, whether fuel injection will overlap with a specified engine event if start of fuel injection is moved in a direction of the shortest path;
incrementing start of fuel injection in the direction of the shortest path if it determined that fuel injection will not overlap with the specified engine event; and
incrementing start of fuel injection in a direction opposite that of the shortest path if it is determined that fuel injection will overlap with the specified engine event.

14. The method of claim 13, wherein the specified engine event is closing of an air intake valve of the internal combustion engine.

15. The method of claim 14, wherein closing of the air intake valve occurs at a different angle in any given cycle of the internal combustion engine.

16. The method of claim 13, further comprising collecting information on engine running conditions and relaying the information to a control circuit.

17. The method of claim 16, wherein the control circuit has a look-up table and the method further comprises inputting the information on engine running conditions into the look-up table in order to determine the destination angle.

18. The method of claim 17, further comprising:
retrieving the source angle;
comparing the source angle to the destination angle to determine if the destination angle differs from the source angle;
incrementing start of fuel injection if the destination angle differs from the source angle, and thereafter storing the destination angle as the source angle; and
not incrementing start of fuel injection if the destination angle does not differ from the source angle, and thereafter re-storing the source angle.

19. The method of claim 18, further comprising:
advancing start of fuel injection if the source angle and the destination angle are less than an angle at which the engine event occurs and if the destination angle is greater than the source angle;
retarding start of fuel injection if the source angle and the destination angle are less than the angle at which the engine event occurs and if the destination angle is less than the source angle;
retarding start of fuel injection if the source angle is less than the angle at which the engine event occurs and if the destination angle is greater than the angle at which the engine event occurs;
retarding start of fuel injection if the source angle and the destination angle are greater than the angle at which the engine event occurs and if the destination angle is less than the source angle;
advancing start of fuel injection if the source angle and the destination angle are greater than the angle at which the engine event occurs and if the destination angle is greater than the source angle;
advancing start of fuel injection if the source angle is greater than the angle at which the engine event occurs and if the destination angle is less than the angle at which the engine event occurs;
retarding start of fuel injection if the source angle is equal to the angle at which the engine event occurs; and advancing start of fuel injection if the destination angle is equal to the angle at which the engine event occurs.

20. A computer-readable medium having computer-executable instructions for performing a method of optimizing fuel injection in an internal combustion engine, the method comprising:

adjusting start of fuel injection from a source angle to a destination angle;

calculating whether one of advancing or retarding the start of injection will provide a shortest path from the source angle to the destination angle;

determining, based on the source angle and a given injection pulse width and angle increment, whether fuel injection will overlap with a specified engine event if start of fuel injection is moved in a direction of the shortest path;

incrementing start of fuel injection in the direction of the shortest path if it is determined that fuel injection will not overlap with the specified engine event; and incrementing, start of fuel injection in a direction opposite that of the shortest path if it is determined that fuel injection will overlap with the specified engine event.

* * * * *